(12) United States Patent
Wang et al.

(10) Patent No.: US 9,489,898 B2
(45) Date of Patent: Nov. 8, 2016

(54) LED BOOST CONVERTER AND BACKLIGHT LED DRIVER DEVICE USING THE SAME

(71) Applicant: SHENZHEN CHINA STAR OPTOELECTRONICS TECHNOLOGY CO., LTD., Shenzhen, Guangdong (CN)

(72) Inventors: Zhao Wang, Shenzhen (CN); Dan Cao, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 89 days.

(21) Appl. No.: 14/240,373

(22) PCT Filed: Jan. 17, 2014

(86) PCT No.: PCT/CN2014/070833
§ 371 (c)(1),
(2) Date: Jun. 4, 2014

(87) PCT Pub. No.: WO2015/081626
PCT Pub. Date: Jun. 11, 2015

(65) Prior Publication Data
US 2015/0161949 A1    Jun. 11, 2015

(30) Foreign Application Priority Data

Dec. 6, 2013 (CN) .......................... 2013 1 0656425

(51) Int. Cl.
| | |
|---|---|
| *H05B 37/02* | (2006.01) |
| *G09G 3/34* | (2006.01) |
| *H05B 33/08* | (2006.01) |
| *G09G 3/00* | (2006.01) |

(52) U.S. Cl.
CPC ............. *G09G 3/3406* (2013.01); *G09G 3/34* (2013.01); *H05B 33/0815* (2013.01); *G09G 3/003* (2013.01); *Y02B 20/341* (2013.01)

(58) Field of Classification Search
CPC ........ H05B 33/08; H05B 37/02; G09G 5/10; G09G 3/34

USPC ........... 315/294, 297, 306–308; 345/76, 102, 345/204
See application file for complete search history.

(56) References Cited

U.S. PATENT DOCUMENTS

| | | | | |
|---|---|---|---|---|
| 9,001,098 B2* | 4/2015 | Seo | ......................... | G09G 3/32 |
| | | | | 315/169.1 |
| 2008/0238387 A1* | 10/2008 | Schmeller | ............. | H02M 3/156 |
| | | | | 323/282 |
| 2011/0115889 A1 | 5/2011 | Kim et al. | ....................... | 348/56 |
| 2013/0033198 A1* | 2/2013 | Kang | ................... | G09G 3/3406 |
| | | | | 315/309 |
| 2014/0111497 A1* | 4/2014 | Choi | ........................ | G09G 5/34 |
| | | | | 345/212 |

FOREIGN PATENT DOCUMENTS

| | | |
|---|---|---|
| CN | 101902855 A | 12/2010 |
| CN | 101944331 A | 1/2011 |
| CN | 102842287 A | 12/2012 |
| CN | 103050096 A | 4/2013 |
| CN | 103165085 A | 6/2013 |
| CN | 102198210 A | 9/2013 |
| CN | 103354086 A | 10/2013 |
| JP | 2003259395 A | 9/2003 |
| KR | 20130055725 A | 5/2013 |

OTHER PUBLICATIONS

International Search Report mailed Jul. 25, 2014, issued to International Application No. PCT/CN2014/070833.

* cited by examiner

*Primary Examiner* — Tung X Le
(74) *Attorney, Agent, or Firm* — Stein IP, LLC

(57) ABSTRACT

The present disclosure discloses an LED boost converter and an LED backlight driver using the same. The LED boost converter comprises an inductive boost circuit used in different display modes for boosting an input voltage to a working voltage necessary for the operation of LED in a current display mode; a detecting circuit used in different display modes for selecting different detecting resistors for the different display modes so as to provide different detecting currents in the inductive boost circuit; and a controller used for providing a pulse width modulation signal so as to drive the inductive boost circuit, and for detecting whether a detecting voltage corresponding to the detecting current exceeds a reference voltage. The present disclosure can avoid possible element failure or abnormal protection in the 3D display mode by arranging a detecting circuit in the LED boost converter so as to offer detecting resistors corresponding to the working currents of the 2D display mode and the 3D display mode respectively.

8 Claims, 3 Drawing Sheets

LED BOOST CONVERTER AND BACKLIGHT LED DRIVER DEVICE USING THE SAME

FIELD OF THE INVENTION

The present disclosure relates to the technology of liquid crystal display, more particularly to an LED boost converter, and an LED backlight driver using the same.

BACKGROUND OF THE INVENTION

Recent years have witnessed widely uses of Liquid Crystal Displays (LCDs) in a variety of electronic products, such as mobile phones, notebook PCs, and color TVs, with a thinning trend among displays.

As liquid crystals do not emit light, LCD panels are not able to emit light either. LCD panels, which require lighting sources, therefore, belong to backlight display devices. Liquid crystal displays form images when liquid crystal molecules are twisted after electrodes in the panels are exerted with voltage, thus allowing light beams from the backlight modules to pass through and achieve the effect of light emission. Backlight is an optical module that can provide back light in LCD products. Therefore, the quality of backlight determines important parameters of LCDs, such as brightness of the display screen, uniformity of emergent light, and color gradation. As a matter of fact, the quality of backlight determines glowing effects of LCDs to a great extent.

As backlight of LCDs, Light-Emitting Diodes (LEDs) tend to replace Cold Cathode Fluorescent Lamps (CCFLs) thanks to their advantages of wider color gamut; better color reduction, stronger controllability, longer lifetime, free of mercury vapor or other poisonous gases, etc. Since an LED is a low-voltage non-linear semi-conductor device, the positive voltage thereof will vary along with variation of currents and temperatures. As a result, a driver circuit is needed to guarantee its stable and reliable performance. Therefore, study of LED driver circuits is a major subject for the person skilled in the art.

Currently, in designing an LED backlight driver circuit, especially an LED boost converter, the same ISEN voltage detection point is used for over current protection about circuits in both 2D and 3D display modes. As a matter of fact, the peak values of the inductive currents in the boost circuits in 2D and 3D display modes are different from each other. In addition, due to differences in model designs and LED operation states, $I_{pk\_2D}$ and $I_{pk\_3D}$ can also be different from each other.

However, in a routine design as shown in FIG. 1, the detecting resistor ($R_1$ as shown in FIG. 1) is designed in accordance with the withstand current of the inductor in the 2D display mode. When the 3D display mode is used, since the peak current is changed, the over current protection performed by the ISEN pin detection of the controller (chip GEC 8310) cannot be able to function in the same way as it does in the 2D display mode. Depending on different model designs, element failure or abnormal protection might happen.

Therefore, one of the major problems to be solved in the art is to overcome the above mentioned defects so as to perform the same over current protection for circuits in different display modes against element failure or abnormal protection.

SUMMARY OF THE INVENTION

One of the technical problems to be solved by the present disclosure is to provide an LED boost converter, which can perform the same over current protection for circuits in different display modes against element failure or abnormal protection. In addition, an LED backlight driver using the aforementioned LED boost converter is also provided.

To solve the above mentioned technical problems, the present disclosure provides an LED boost converter, which includes an inductive boost circuit used in different display modes for boosting an input voltage to a working voltage necessary for the operation of LED in a current display mode; a detecting circuit, connected to the inductive boost circuit and used in different display modes for selecting different detecting resistors for the different display modes so as to provide different detecting currents of the inductive boost circuit; and a controller used for providing a pulse width modulation signal so as to drive the inductive boost circuit, and for detecting whether a detecting voltage corresponding to the detecting current exceeds a reference voltage, the controller including a GATE end connected to the inductive boost circuit and a current detection input end connected to the detecting circuit, wherein said display modes comprise a 2D display mode and a 3D display mode.

In one embodiment, when the inductive peak current $I_{pk\_2D}$ of the 2D display mode inductive boost circuit is smaller than the inductive peak current $I_{pk\_3D}$ of the 3D display mode inductive boost circuit, the detecting circuit further includes: a first resistor, with one end thereof connected to a ground, and the other end thereof connected to a source of a switching transistor in the inductive boost circuit; a second resistor, with one end thereof connected to the source of the switching transistor together with the first switching transistor; and a first switching transistor, with a grid thereof connected to a 2D/3D switching signal input end, a drain thereof connected to the other end of the second resistor, and a source thereof connected to the ground.

In one embodiment, when the inductive peak current $I_{pk\_2D}$ of the 2D display mode inductive boost circuit is larger than the inductive peak current $I_{pk\_3D}$ of the 3D display mode inductive boost circuit, the detecting circuit further includes: a first resistor, with one end thereof connected to the ground reference, and the other end thereof connected to a source of the switching transistor of the inductive boost circuit; a second resistor, with one end thereof connected to the source of the switching transistor together with the first resistor; a first switching transistor, with a drain thereof connected to the other end of the second resistor and a source thereof connected to the ground; a third resistor; and a second switching transistor, with a grid thereof connected to the 2D/3D switching signal input end, a drain thereof connected to a voltage supply via the third resistor and further to a grid of the first switching transistor, and a source connected to the ground.

In one embodiment, when the 2D/3D switching signal input end outputs a 2D signal, the first switching transistor is cut off, and the detecting resistance value in the 2D display mode equals the resistance value of the first resistor; and when the 2D/3D switching signal input end outputs a 3D signal, the first switching transistor is switched on, and the detecting resistance in the 3D display mode equals the resistance value of the first resistor and the second resistor in parallel.

In one embodiment, when the 2D/3D switching signal input end outputs a 2D signal, the second switching transistor is cut off and the first switching transistor is switched on, and the detecting resistance value in the 2D display mode equals the resistance value of the first resistor and the second resistor in parallel; and when the 2D/3D switching signal input end outputs a 3D signal, the first switching transistor is cut off and the second switching transistor is switched on, and the detecting resistance value in the 3D display mode equals the resistance value of the first resistor.

In one embodiment, the resistance values of the first resistor and the second resistor respectively can be calculated by:

$$R_1 = (R_{2D}, R_{3D})_{max}$$

$$R_2 = \frac{R_{2D} R_{3D}}{|R_{2D} - R_{3D}|}$$

wherein, $R_{2D}$ and $R_{3D}$ are the detecting resistance values in the 2D display mode and the 3D display mode respectively, which can be calculated by:

$$R_{2D} = \frac{U_p}{I_{pk\_2D}}$$

$$R_{3D} = \frac{U_p}{I_{pk\_3D}}$$

wherein, $U_P$ is the reference voltage of the controller, and $I_{pk\_2D}$ and $I_{pk\_3D}$ are the inductive peak currents of the inductive boost circuit in the 2D display mode and 3D display mode respectively, which can be calculated by:

$$I_{pk\_2D} = \frac{I_{o\_2D} + V_{o\_2D}}{V_{IN}} + \frac{2V_{IN}(V_{o\_2D} - V_{IN})}{Lf V_{o\_2D}}$$

$$I_{pk\_3D} = \frac{I_{o\_3D} + V_{o\_3D}}{V_{IN}} + \frac{2V_{IN}(V_{o\_3D} - V_{IN})}{Lf V_{o\_3D}}$$

wherein, $I_{o\_2D}$ and $V_{o\_2D}$ are the current and the voltage needed by the LED in the 2D display mode respectively, $I_{o\_3D}$ and $V_{o\_3D}$ are the current and the voltage needed by the LED in the 3D display mode respectively, $V_{IN}$ is the input voltage, L is the inductive value of the inductive boost circuit, and f is the switching frequency of the switching transistor of the inductive boost circuit.

According to another aspect of the present disclosure, it provides an LED backlight driver which includes an inductive boost circuit used in different display modes for boosting an input voltage to a working voltage necessary for the operation of LED in the current display mode; a detecting circuit, connected to the inductive boost circuit and used in different display modes for selecting different detecting resistors for the different display modes so as to provide different detecting currents in the inductive boost circuit; and a controller used for providing a pulse width modulation signal so as to drive the inductive boost circuit, and for detecting whether a detecting voltage corresponding to the detecting current exceeds the reference voltage, the controller including a GATE end connected to the inductive boost circuit and a current detection input end connected to the detecting circuit, wherein the display modes comprise a 2D display mode and a 3D display mode.

In one embodiment, when the inductive peak current $I_{pk\_2D}$ of the 2D display mode inductive boost circuit is smaller than the inductive peak current $I_{pk\_3D}$ of the 3D display mode inductive boost circuit, the detecting circuit further includes: a first resistor, with one end thereof connected to a ground, and the other end thereof connected to a source of the switching transistor in the inductive boost circuit; a second resistor, with one end thereof connected to the source of the switching transistor together with the first resistor; and a first switching transistor, with a grid thereof connected to the 2D/3D switching signal input end, a drain thereof connected to the other end of the second resistor, and a source thereof connected to the ground.

In one embodiment, when the inductive peak current $I_{pk\_2D}$ of the 2D display mode inductive boost circuit is larger than the inductive peak current $I_{pk\_3D}$ of the 3D display mode inductive boost circuit, the detecting circuit further includes: a first resistor, with one end thereof connected to a ground, and the other end thereof connected to a source of the switching transistor in the inductive boost circuit; a second resistor, with one end thereof connected to the source of the switching transistor together with the first resistor; a first switching transistor, with a drain thereof connected to the other end of the second resistor, and a source thereof connected to the ground; a third resistor; and a second switching transistor, with a grid thereof connected to the 2D/3D switching signal input end, a drain thereof connected to the voltage supply via the third resistor, and further to a grid of the first switching transistor, and a source thereof connected to the ground.

Compared with the prior art, one or a plurality of embodiments of the present disclosure may have the following advantages.

The present disclosure can avoid possible element failure or abnormal protection in the 3D display mode by arranging a detecting circuit in the LED boost converter so as to offer ISEN detecting resistors corresponding to the working currents of the 2D display mode and the 3D display mode respectively.

The present disclosure will be described with preferred embodiments and their usages. However, it should be understood by one skilled in the art that the present disclosure is not limited to the embodiments. Rather, the present disclosure is intended to cover all substitutes, modifications, and equivalents of the described embodiments without departing from the scope and the spirit of the disclosure that is intended to be limited only by the appended claims.

BRIEF DESCRIPTION OF THE DRAWINGS

The accompanying drawings which are provided for further explanation of the present disclosure, constitute a part of the disclosure, and are used to facilitate hither understanding of the present disclosure along with the embodiments. However, the present disclosure is not limited thereto. In the drawings.

DETAILED DESCRIPTION OF THE EMBODIMENTS

To better explain the purposes, features, and merits of the present disclosure, the present disclosure is to be described in detail below with reference to the accompanying drawings.

Figure 1:
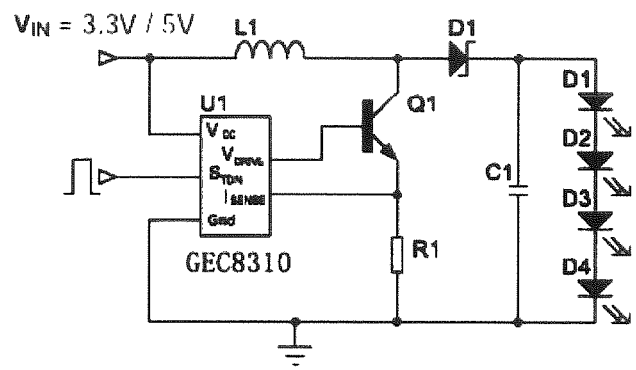
FIG. 1 is a schematic diagram of an LED boost converter in the prior art.
Figure 2:
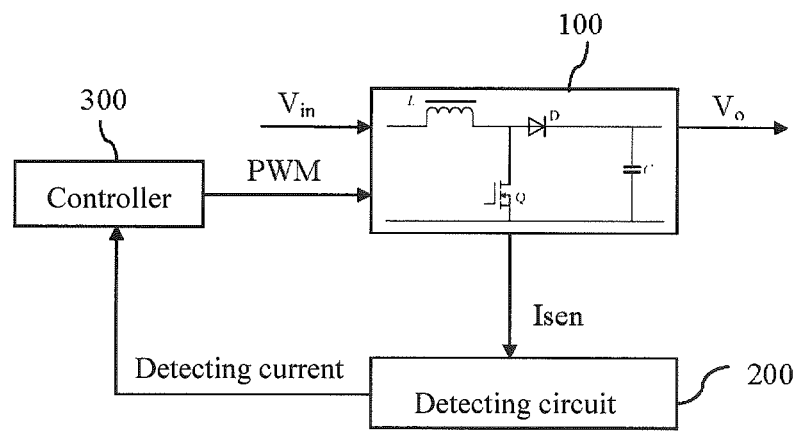
FIG. 2 is a schematic diagram of an LED boost converter according to an embodiment of the present disclosure.

With reference to FIG. 2, it shows an LED boost converter according to an embodiment of the present disclosure. The LED boost converter, via a detecting circuit arranged therein, can be used in 2D/3D display modes for selecting different detecting resistors so as to provide different ISEN current detecting points for ISEN current detecting input ends which can control the IC, thus avoiding element failure or abnormal protection that may exist in the 3D display mode. The LEDs in the present disclosure can be connected in series, in parallel, or in series-parallel. In the embodiments of the present disclosure, the LEDs in actual circuits are connected in a series-parallel combination circuit. A series of LEDs among the series-parallel combination circuit will be illustrated in detail in the following.

The LED boost converter includes an inductive boost circuit 100, which can be used in different display modes for boosting an input voltage to a working voltage necessary for the LED operated in a current display mode. The inductive boost circuit 100 includes an inductor, a switching transistor, a diode, and a capacitor.

In the inductive boost circuit 100, the inductor is an energy converting device for inter-conversion between electric energy and magnetic field energy. When the switching transistor is switched on, the inductor converts electric energy into magnetic field energy which is stored; and when the switching transistor is cut off, the inductor converts the stored magnetic field energy into electric field energy. The electric field energy, after being added to the input voltage, goes through the diode and the capacitor to be filtered to generate a smooth direct voltage to the payload. Since the direct voltage is the combination of the input voltage and the electric energy converted from the inductive magnetic field energy, the output voltage is higher than the input voltage.

The LED boost converter further includes a detecting circuit 200, which can be used in different display modes for selecting different detecting resistors for the different display modes, so as to provide different detecting currents in the inductive boost circuit 100. The detecting circuit 200 is connected to a source of the switching transistor of the inductive boost circuit 100.

The LED boost converter further includes a controller 300 (generally a circuit driver IC), which can be used for providing a pulse width modulation (PWM) signal so as to drive the inductive boost circuit 100, and for detecting whether the detecting voltage corresponding to the detecting current exceeds a reference voltage. The controller 300 includes a GATE end which is connected to a gate of the switching transistor of the inductive boost circuit 100, and a current detecting input (ISSN) end which is connected to the detecting circuit 200. The display modes of the present disclosure comprise a 2D display mode and a 3D display mode.

Figure 3:
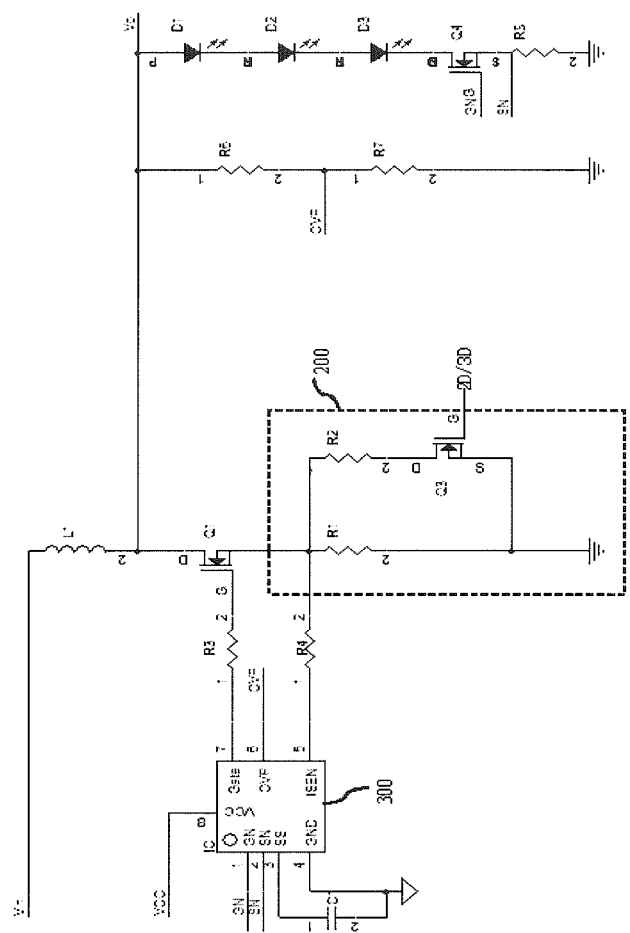
FIG. 3 is a schematic diagram of a first circuit of the LED boost converter according to the present disclosure.

FIG. 3 is a schematic diagram of a first circuit of the LED boost converter according to the present disclosure. The circuit can be used when the inductive peak current $I_{pk\_2D}$ of the 2D display mode inductive boost circuit 100 is smaller than the inductive peak current $I_{pk\_3D}$ of the 3D display mode inductive boost circuit. As shown in FIG. 3, the detecting circuit 200 comprises: a first resistor $R_1$, with one end thereof connected to the ground, and the other end thereof connected to a source of the switching transistor of the inductive boost circuit 100; a second resistor $R_2$, with one end thereof connected to the source of the switching transistor of the inductive boost circuit 100 together with the first resistor $R_1$; and a first switching transistor Q3, with a grid connected to the 2D/3D switching signal input end, a drain connected to the other end of the second resistor $R_2$, and a source connected to the ground.

In the following how the over current protection is conducted by means of the detecting circuit 200 will be explained in detail. When the 2D/3D switching signal input end outputs a 2D signal (a low voltage signal), the first switching transistor Q3 is cut off. At this time, the resistance value of the detecting resistor in the 2D display mode equals the resistance value of the first resistor $R_1$.

When the 2D/3D switching signal input end outputs a 3D signal (a high voltage signal), the first switching transistor Q3 is switched on. The resistance value of the detecting resistor in the 3D display mode equals the resistance value of the first resistor $R_1$ and the second resistor $R_2$ in parallel.

Finally, the ISEN end of the controller 300 acquires the detecting current of the inductor in the present inductive boost circuit 100 according to the present detecting resistance value (the resistance value of the first resistor $R_1$, or the resistance value of the first resistor $R_1$ and the second resistor $R_2$ in parallel), and then uses the detecting current to determine whether the detecting voltage corresponding to the detecting current exceeds the reference voltage. Specifically, in actual operation, if the detecting current exceeds a prescribed protecting current, the circuit driver IC 300 will stop working automatically, and thus the LED working voltage and current terminate as well.

Figure 4:
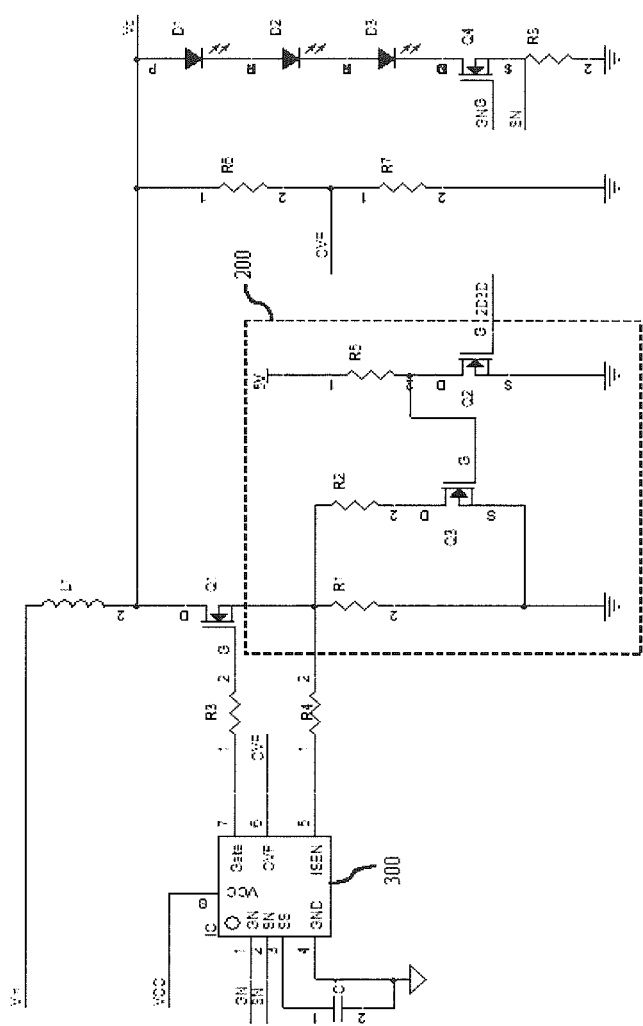
FIG. 4 is a schematic diagram of a second circuit of the LED boost converter according to the present disclosure.

FIG. 4 is a schematic diagram of a second circuit of the LED boost converter of the present invention. The circuit can be used when the inductive peak current $I_{pk\_2D}$ of the 2D display mode inductive boost circuit 100 is larger than the inductive peak current $I_{pk\_3D}$ of the 3D display mode inductive boost circuit. As shown in FIG. 4, the detecting circuit 200 further includes: a first resistor $R_1$, with one end thereof connected to the ground, and the other end thereof connected to the source of the switching transistor in the inductive boost circuit 100; a second resistor $R_2$, with one end thereof connected to the source of the switching transistor in the inductive boost circuit 100 together with first resistor $R_1$; a first switching transistor Q3, with a drain thereof connected to the other end of the second resistor $R_2$, and a source thereof connected to the ground; and a second switching transistor Q2, with a grid thereof connected to the 2D/3D switching signal input end, a drain thereof connected to a voltage supply (a 5V voltage as shown in FIG. 4) via a third resistor $R_5$ and further to the grid of the first switching transistor Q3, and a source thereof connected to the ground. The third resistor $R_5$ is primarily used for restraining currents when the second switching transistor Q2 is switched on.

In the following how the over current protection is conducted by means of the detecting circuit 200 will be explained in detail.

When the 2D/3D switching signal input end outputs a 2D signal, the second switching transistor Q2 is cut off, and the first switching transistor Q3 is switched on. The resistance value of the detecting resistor in the 2D display mode equals the resistance value of the first resistor $R_1$ and the second resistor $R_2$ in parallel.

Specifically, when a 2D signal is input, the Gate voltage of the second switching transistor Q2 is low, and thus the second switching transistor Q2 is cut off. The Gate voltage of the first switching transistor Q3 is connected to the voltage supply via the third resistor $R_5$, and thus the first switching transistor Q3 is switched on. It can be easy to understand that the resistance value of the detecting resistor in the 2D display mode equals the resistance value of the first resistor R1 and the second resistor R2 in parallel.

When the 2D/3D switching signal input end outputs a 3D signal, the first switching transistor Q3 is cut off and the second switching transistor Q2 is switched on. The resistance value of the detecting resistor in the 3D display mode equals the resistance value of the first resistor $R_1$.

Specifically, when the 3D signal is input, the Gate voltage of the second switching transistor Q2 is high, and thus the second switching transistor Q2 is switched on. At this moment, the Gate voltage of the first switching transistor Q3 is pulled down, and thus Q3 is cut off, so that the second resistor R2 is not in the circuit. Therefore, the resistance value of the detecting resistor in the 3D display mode equals the resistance value of the first resistor R1.

Finally, the ISEN end of the controller 300 acquires the detecting current of the inductor in the present inductive boost circuit 100 according to the present detecting resistance value (the resistance value of the first resistor $R_1$, or the resistance value of the first resistor $R_1$ and the second resistor $R_2$ in parallel), and then uses the detecting current to determine whether the detecting voltage corresponding to the detecting current exceeds the reference voltage. If so, the circuit driver IC 300 will stop working automatically. Since detecting resistors are provided corresponding to the working currents in the 2D display mode and the 3D display mode respectively, element failure or abnormal protection that may exist in the 3D display mode can be prevented.

Moreover, the resistance values of the first resistor and the second resistor respectively can be calculated by:

$$R_1 = (R_{2D}, R_{3D})_{max}$$

$$R_2 = \frac{R_{2D} R_{3D}}{|R_{2D} - R_{3D}|}$$

wherein, $R_{2D}$ and $R_{3D}$ are the resistance values of the detecting resistors in the 2D display mode and the 3D display mode respectively, which can be calculated according to the following formulae:

$$R_{2D} = \frac{U_P}{I_{pk\_2D}}$$

$$R_{3D} = \frac{U_P}{I_{pk\_3D}}$$

wherein, $U_P$ is the reference voltage of the controller, and $I_{pk\_2D}$ and $I_{pk\_3D}$ are the inductive peak currents of the inductive boost circuit in the 2D display mode and 3D display mode respectively, which can be calculated by:

$$I_{pk\_2D} = \frac{I_{O\_2D} + V_{o\_2D}}{V_{IN}} + \frac{2V_{IN}(V_{O\_2D} - V_{IN})}{LfV_{O\_2D}}$$

$$I_{pk\_3D} = \frac{I_{O\_3D} + V_{o\_3D}}{V_{IN}} + \frac{2V_{IN}(V_{O\_3D} - V_{IN})}{LfV_{O\_3D}}$$

wherein, $I_{o\_2D}$ and $V_{o\_2D}$ are the current and the voltage needed by an LED in the 2D display mode respectively, $I_{o\_3D}$ and $V_{o\_3D}$ the current and the voltage needed by an LED in the 3D display mode respectively, $V_{IN}$ is the input voltage, L is the inductive value of the inductive boost circuit, and f is the switching frequency of the switching transistor of the inductive boost circuit.

The present disclosure further relates to an LED backlight driver which includes the above mentioned LED boost converter.

In conclusion, according to the present disclosure, possible element failure or abnormal protection in the 3D display mode can be avoided by providing a detecting circuit in the LED boost converter so as to offer ISEN detecting resistors corresponding to working currents of the 2D display mode and the 3D display mode respectively.

The present disclosure has been described in conjunction with only preferred embodiments thereof, but it is understood that the scope of the present disclosure is not limited thereto. Readily conceivable variations and substitutions to the described embodiments can be carried out without departing from the scope or the spirit of the disclosure that is intended to be limited only by the appended claims.

The invention claimed is:
1. An LED boost converter, comprising:
an inductive boost circuit used in different display modes for boosting an input voltage to a working voltage necessary for the operation of an LED in a current display mode;
a detecting circuit, connected to the inductive boost circuit and used in different display modes for selecting different detecting resistors for the different display modes so as to provide different detecting currents in the inductive boost circuit; and
a controller used for providing a pulse width modulation signal so as to drive the inductive boost circuit, and for detecting whether a detecting voltage corresponding to the detecting current exceeds a reference voltage, the controller including a GATE end connected to the inductive boost circuit and a current detection input end connected to the detecting circuit; and
wherein the display modes comprise a 2D display mode and a 3D display mode, and
wherein when an inductive peak current $I_{pk\_2D}$ of the 2D display mode inductive boost circuit is smaller than an inductive peak current $I_{pk\_3D}$ of the 3D display mode inductive boost circuit, the detecting circuit further includes:
a first resistor, with one end thereof connected to a ground, and the other end thereof connected to a source of a switching transistor of the inductive boost circuit;
a second resistor, with one end thereof connected to the source of the switching transistor together with the first resistor; and
a first switching transistor, with a grid thereof connected to a 2D/3D switching signal input end, a drain thereof connected to the other end of the second resistor, and a source thereof connected to the ground.
2. An LED boost converter, comprising:
an inductive boost circuit used in different display modes for boosting an input voltage to a working voltage necessary for the operation of an LED in a current display mode;
a detecting circuit, connected to the inductive boost circuit and used in different display modes for selecting different detecting resistors for the different display modes so as to provide different detecting currents in the inductive boost circuit; and
a controller used for providing a pulse width modulation signal so as to drive the inductive boost circuit, and for detecting whether a detecting voltage corresponding to the detecting current exceeds a reference voltage, the controller including a GATE end connected to the inductive boost circuit and a current detection input end connected to the detecting circuit; and wherein the display modes comprise a 2D display mode and a 3D display mode, and wherein when an inductive peak current $I_{pk\_2D}$ of the 2D display mode inductive boost circuit is larger than an inductive peak current $I_{pk\_3D}$ of the 3D display mode inductive boost circuit, the detecting circuit further includes:

a first resistor, with one end thereof connected to the ground, and the other end thereof connected to a source of a switching transistor of the inductive boost circuit;

a second resistor, with one end thereof connected to the source of the switching transistor together with the first resistor;

a first switching transistor, with a drain thereof connected to the other end of the second resistor, and a source thereof connected to the ground;

a third resistor; and a second switching transistor, with a grid thereof connected to the 2D/3D switching signal input end, a drain thereof connected to a voltage supply via the third resistor and further to a grid of the first switching transistor, and a source thereof connected to the ground.

3. The LED boost converter according to claim 1, wherein the resistance values of the first resistor and the second resistor respectively are calculated by:

$$R_1 = (R_{2D}, R_{3D})_{max}$$

$$R_2 = \frac{R_{2D}R_{3D}}{|R_{2D} - R_{3D}|}$$

wherein, $R_{2D}$ and $R_{3D}$ are the detecting resistance values in the 2D display mode and the 3D display mode respectively, which are calculated by:

$$R_{2D} = \frac{U_p}{I_{pk\_2D}}$$

$$R_{3D} = \frac{U_p}{I_{pk\_3D}}$$

wherein, $U_p$ is the reference voltage of the controller, and $I_{pk\_2D}$ and $I_{pk\_3D}$ are the inductive peak currents of the inductive boost circuit in the 2D display mode and 3D display mode respectively, which are calculated by:

$$I_{pk\_2D} = \frac{I_{o\_2D} + V_{o\_2D}}{V_{IN}} + \frac{2V_{IN}(V_{o\_2D} - V_{IN})}{LfV_{o\_2D}}$$

$$I_{pk\_3D} = \frac{I_{o\_3D} + V_{o\_3D}}{V_{IN}} + \frac{2V_{IN}(V_{o\_3D} - V_{IN})}{LfV_{o\_3D}}$$

wherein, $I_{o\_2D}$ and $V_{o\_2D}$ are the current and the voltage needed by the LED in the 2D display mode respectively, $I_{o\_3D}$ and $V_{o\_3D}$ are the current and the voltage needed by the LED in the 3D display mode respectively, $V_{IN}$ is the input voltage, L is the inductive value of the inductive boost circuit, and f is a switching frequency of the switching transistor of the inductive boost circuit.

4. The LED boost converter according to claim 1, wherein the resistance values of the first resistor and the second resistor respectively are calculated by:

$$R_1 = (R_{2D}, R_{3D})_{max}$$

$$R_2 = \frac{R_{2D}R_{3D}}{|R_{2D} - R_{3D}|}$$

wherein, $R_{2D}$ and $R_{3D}$ are the detecting resistance values in the 2D display mode and the 3D display mode respectively, which are calculated by:

$$R_{2D} = \frac{U_p}{I_{pk\_2D}}$$

$$R_{3D} = \frac{U_p}{I_{pk\_3D}}$$

wherein, $U_p$ is the reference voltage of the controller, and $I_{pk\_2D}$ and $I_{pk\_3D}$ are the inductive peak currents of the inductive boost circuit in the 2D display mode and 3D display mode respectively, which are calculated by:

$$I_{pk\_2D} = \frac{I_{o\_2D} + V_{o\_2D}}{V_{IN}} + \frac{2V_{IN}(V_{o\_2D} - V_{IN})}{LfV_{o\_2D}}$$

$$I_{pk\_3D} = \frac{I_{o\_3D} + V_{o\_3D}}{V_{IN}} + \frac{2V_{IN}(V_{o\_3D} - V_{IN})}{LfV_{o\_3D}}$$

wherein, $I_{o\_2D}$ and $V_{o\_2D}$ are the current and the voltage needed by the LED in the 2D display mode respectively, $I_{o\_3D}$ and $V_{o\_3D}$ are the current and the voltage needed by the LED in the 3D display mode respectively, $V_{IN}$ is the input voltage, L is the inductive value of the inductive boost circuit, and f is a switching frequency of the switching transistor of the inductive boost circuit.

5. The LED boost converter according to claim 1, wherein when the 2D/3D switching signal input end outputs a 2D signal, the first switching transistor is cut off, and the detecting resistance value in the 2D display mode equals the resistance value of the first resistor; and when the 2D/3D switching signal input end outputs a 3D signal, the first switching transistor is switched on, and the detecting resistance in the 3D display mode equals the resistance value of the first resistor and the second resistor in parallel.

6. The LED boost converter according to claim 1, wherein when the 2D/3D switching signal input end outputs a 2D signal, the second switching transistor is cut off and the first switching transistor is switched on, and the detecting resistance value in the 2D display mode equals the resistance value of the first resistor and the second resistor in parallel; and when the 2D/3D switching signal input end outputs a 3D signal, the first switching transistor is cut off and the second switching transistor is switched on, and the detecting resistance value in the 3D display mode equals the resistance value of the first resistor.

7. An LED backlight driver, comprising:

an inductive boost circuit used in different display modes for boosting an input voltage to a working voltage necessary for the operation of an LED in a current display mode;

a detecting circuit, connected to the inductive boost circuit and used in different display modes for selecting different detecting resistors for the different display modes so as to provide different detecting currents in the inductive boost circuit; and a controller used for providing a pulse width modulation signal so as to drive the inductive boost circuit, and for detecting whether the detecting voltage corresponding to the detecting current exceeds a reference voltage, the controller including a GATE end connected to the inductive boost circuit and a current detection input end connected to the detecting circuit; and wherein the display modes comprise a 2D display mode and a 3D display mode, and wherein when an inductive peak current $I_{pk\_2D}$ of the 2D display mode inductive boost circuit is smaller than an inductive peak current $I_{pk\_3D}$ of the 3D display mode inductive boost circuit, the detecting circuit further includes:

a first resistor, with one end thereof connected to a ground, and the other end thereof connected to a source of the switching transistor in the inductive boost circuit;

a second resistor, with one end thereof connected to the source of the switching transistor together with the first resistor; and a first switching transistor, with a grid thereof connected to the 2D/3D switching signal input end, a drain thereof connected to the other end of the second resistor, and a source thereof connected to the ground.

8. An LED backlight driver, comprising:

an inductive boost circuit used in different display modes for boosting an input voltage to a working voltage necessary for the operation of an LED in a current display mode;

a detecting circuit, connected to the inductive boost circuit and used in different display modes for selecting different detecting resistors for the different display modes so as to provide different detecting currents in the inductive boost circuit; and a controller used for providing a pulse width modulation signal so as to drive the inductive boost circuit, and for detecting whether the detecting voltage corresponding to the detecting current exceeds a reference voltage, the controller including a GATE end connected to the inductive boost circuit and a current detection input end connected to the detecting circuit; and wherein the display modes comprise a 2D display mode and a 3D display mode, and wherein when an inductive peak current $I_{pk\_2D}$ of the 2D display mode inductive boost circuit is larger than an inductive peak current $I_{pk\_3D}$ of the 3D display mode inductive boost circuit, the detecting circuit further includes:

a first resistor, with one end thereof connected to the ground, and the other end thereof connected to a source of a switching transistor in the inductive boost circuit;

a second resistor, with one end thereof connected to the source of the switching transistor together with the first resistor;

a first switching transistor, with a drain thereof connected to the other end of the second resistor, and a source connected to the ground reference;

a third resistor; and a second switching transistor with a grid thereof connected to the 2D/3D switching signal input end, a drain thereof connected to a voltage supply via the third resistor, and further to a grid of the first switching transistor, and a source thereof connected to the ground.

* * * * *